United States Patent
Kuppers

(10) Patent No.: US 6,715,963 B2
(45) Date of Patent: Apr. 6, 2004

(54) DEVICE AND METHOD FOR LAYING A PIPELINE ON A SEABED

(75) Inventor: Peter-Paul Maria Kuppers, Leidschendam (NL)

(73) Assignee: Allseas Group S.A. (CH)

( * ) Notice: Subject to any disclaimer, the term of this patent is extended or adjusted under 35 U.S.C. 154(b) by 0 days.

(21) Appl. No.: 10/000,657

(22) Filed: Nov. 13, 2001

(65) Prior Publication Data

US 2002/0090269 A1 Jul. 11, 2002

(30) Foreign Application Priority Data

Nov. 17, 2000 (NL) .............................. 1016641

(51) Int. Cl.[7] ................................ F16L 1/14
(52) U.S. Cl. ........................ 405/166; 405/177
(58) Field of Search .............. 405/154.1, 158, 405/166, 167, 169–170, 174, 177, 184

(56) References Cited

U.S. PATENT DOCUMENTS

| | | | | | |
|---|---|---|---|---|---|
| 3,844,129 A | * | 10/1974 | Finlay | ........................ | 405/166 |
| 4,127,006 A | * | 11/1978 | Oosterkamp | ................ | 405/171 |
| 5,449,252 A | * | 9/1995 | Maloberto et al. | .......... | 405/166 |

* cited by examiner

Primary Examiner—Heather Shackelford
Assistant Examiner—Sunil Singh
(74) Attorney, Agent, or Firm—Mark Zovko

(57) ABSTRACT

A device for laying a pipeline on a seabed. A vessel for laying a pipeline, which is fitted with a stinger for guiding a pipe string descending from the vessel and with a clamping structure for clamping the pipe string to the vessel, and support structure for supporting the part of the pipe string that extends between the surface and the seabed. The support structure includes a cantilever structure, which is fixedly connected to the vessel, and clamping members that mate therewith. The clamping members engage the pipe string and transmit axial stresses from the pipe string to the vessel via the cantilever structure.

10 Claims, 2 Drawing Sheets

DEVICE AND METHOD FOR LAYING A PIPELINE ON A SEABED

Figure 1:
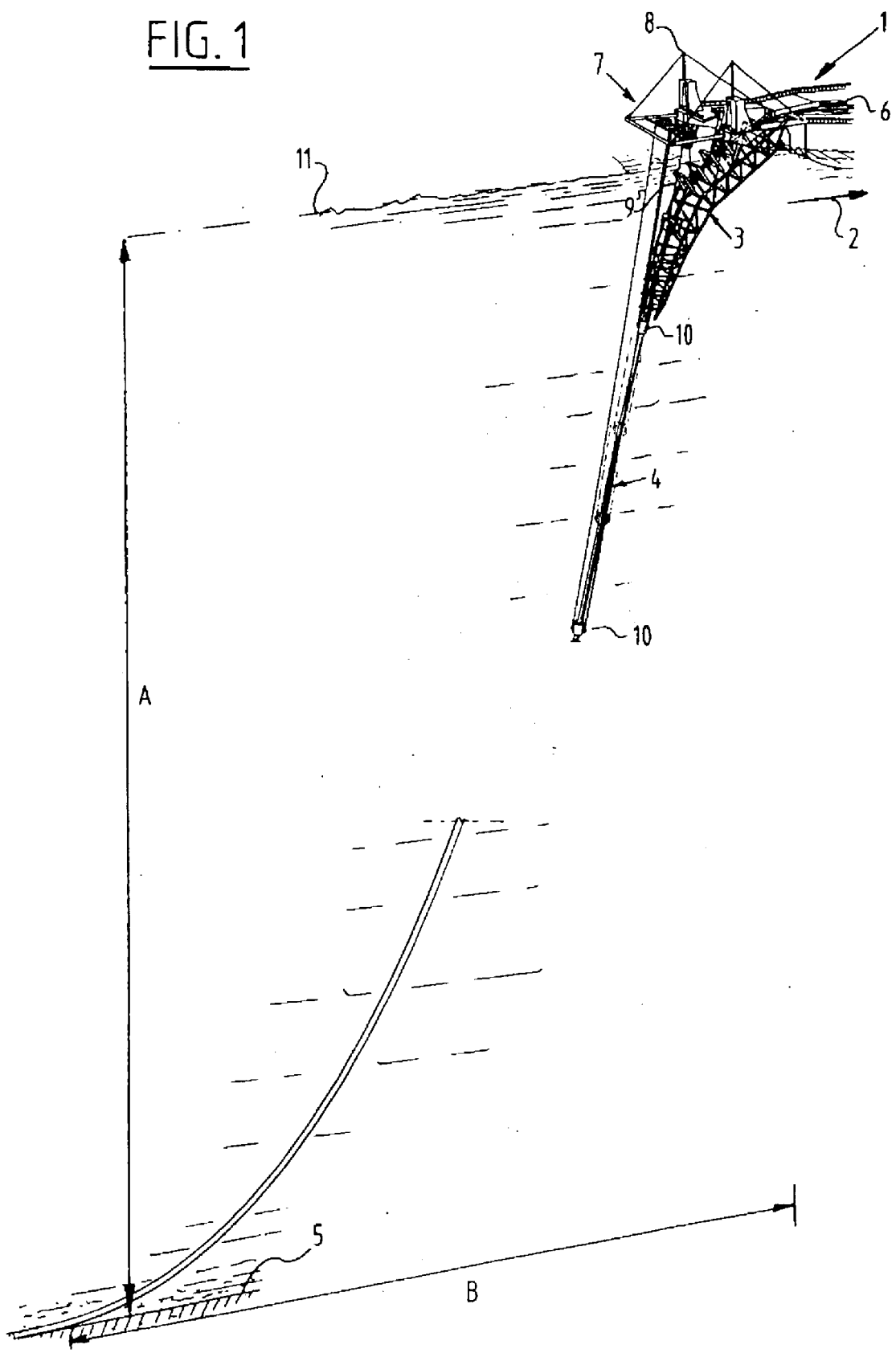

The present invention relates to a device for laying a pipeline on a seabed, comprising a vessel for laying a pipeline, which is fitted with a stinger for guiding a pipe string descending from the vessel and with clamping means for clamping said pipe string to the vessel, and supporting means for supporting the part of the pipe string that extends between the surface and the seabed. The invention furthermore relates to a method for laying a pipeline on a seabed.

So far, the so-called S-laying method has generally been used for laying pipelines. The pipeline is thereby pulled up from the seabed, via a so-called stinger, onto a horizontal deck of a pipe laying vessel in an S-shape as it were. Present on said deck is the welding line. The longer said welding line, the more work stations it will comprise. An increase of the number of work stations leads to an increase of the production rate of the pipeline that is to be laid.

In the case of deeper water, for example in the order of 2000 meters, the pipeline must be bent more in vertical direction by the stinger. If this is not done, the length of the pipeline between the pipe laying vessel and the seabed will become enormous, so that very large forces will be required in order to keep the pipe string intact. If more vertical bending is required, the length of the stinger needs to be increased. Especially in the case of pipes having a large diameter this will lead to a structure which is difficult to handle. Also in the case of a pipe string which leaves the pipe laying vessel more in vertical direction, the weight of the part of the pipe string that extends between the vessel and the seabed will be quite large, albeit much smaller than in the former case. This transmission of weight and strong bending of the pipe string via a long stinger structure is not an easy job.

Consequently, the J-laying method is frequently used, wherein the welding line extends nearly vertically with respect to the pipe laying vessel. In such a case the pipe string need not be bent via a stinger, therefore. A major drawback of this system, however, is the fact that the number of available work stations is limited and that it is not possible to achieve the high production rate that can be achieved with the S-laying method.

The object of the present invention is to provide a device and a method for laying a pipeline on a seabed wherein the advantages of the two above-described methods are combined.

According to the present invention, the device for laying a pipeline on a seabed is to that end characterized in that said supporting means comprise a cantilever structure which is fixedly connected to the vessel and engaging means that mate therewith, which means engage the pipe string so as to transmit axial stresses from the pipe string to the vessel via the cantilever structure.

When pipes are being laid in deep water, the supporting means transmit the mainly vertical pulling force of the pipe string, or the weight of the part of the pipe string that extends between the vessel and the seabed, to the vessel. As a result, the forces that are exerted on the stinger remain small and the stinger construction that is used for laying pipes in shallow water can also be used for laying pipes in deep water. In addition to this the advantage of a high production rate of the S-laying method is retained when using the device according to the present invention. Since the same vessel can be used for shallow water as well as for deep water, a transition from shallow water to deep water will not lead to delays caused by adaptations or changes to other systems that may be required.

In addition to that, the invention relates to a method for laying a pipeline on a seabed wherein a pipe string is bent over a stinger from a pipeline-laying vessel and lowered to the seabed, wherein the pipe string is clamped to the vessel for welding respective lengths of pipeline to the end of the pipe string, and wherein the part of the pipe string that extends between the surface and the seabed is supportedied by supporting means that are fixedly connected to the vessel so as to transmit axial stresses from the pipe string to the vessel via said supporting means.

The present invention will now be explained in more detail with reference to the appended drawings.

Figure 2:
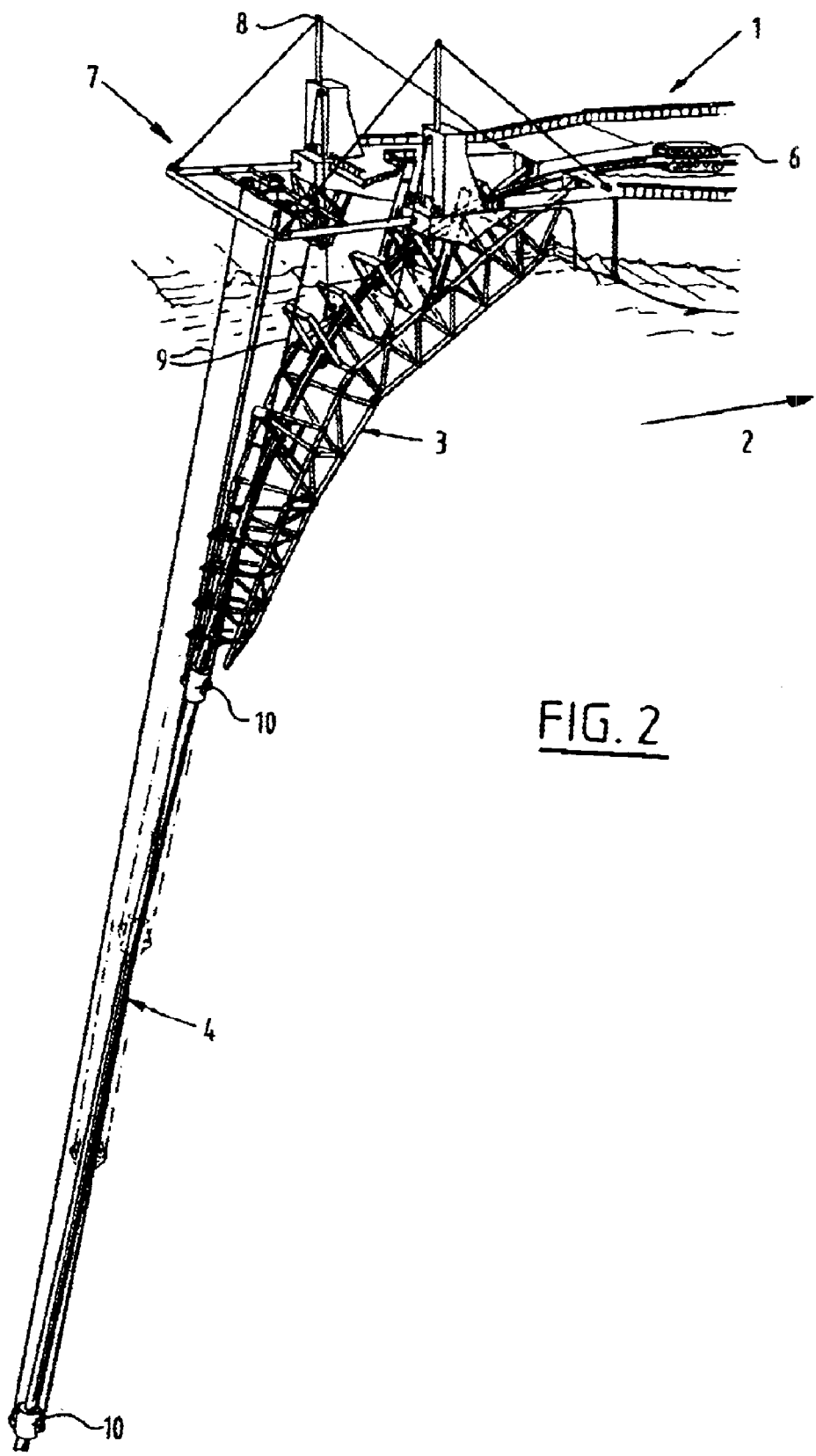

In the drawing:

FIG. 1 is a perspective view of a device according to the present invention; and FIG. 2 is a larger-scale view of the device of FIG. 1.

The device of FIG. 1 comprises a pipe laying vessel 1 which is known per se, which is propelled in the direction indicated by arrow 2 and which comprises a so-called stinger 3 near its stern. The stinger 3 leads a pipe string 4 from a horizontal position on the pipe laying vessel 1 to a substantially vertical position. For example, a pipeline is being laid at a depth A of about 2000 m, in which case the distance indicated by arrow B is about 700 m. The pipe laying vessel 1 is of the type disclosed in GB-A-2,232,740, for example, whose contents are considered to be incorporated herein.

According to the invention, the pipe string 4 is laid on a seabed 5, which may lie at a depth in the order of 2000 meters. Aboard the pipe laying vessel 1, a respective length of pipeline is added to the pipe string 4 by welding. The pipe string 4 is held in position aboard the pipe laying vessel 1 by means of a clamping system 6, whilst the pipe string 4 is lowered into the water either gradually or in steps. The clamping system 6 consists of rollers engaging the periphery of the pipe string 4, which rollers exert a force in a direction transversely to the longitudinal direction of the pipe string 4. Such a clamping system 6 allows a relative movement in longitudinal direction of the pipe string 4, whilst the pipe string 4 is clamped to the pipe laying vessel 1.

According to the invention, the part of the pipe string 4 that extends between the pipe laying vessel 1 and the seabed 5 is supported by supporting means 7, which are fixedly connected to the pipe laying vessel 1. The supporting means 7 comprise a crane 8 which is present on the stern of the pipe laying vessel 1. Winches 9 are attached to the crane 8, from which clamping members 10 surrounding the periphery of the pipe string 4 are suspended. Said clamping members 10 are capable of movement with respect to the pipe string 4 in the longitudinal direction thereof. The embodiment that is shown in the figures comprises two clamping members 10, wherein one of said clamping members clampingly engages around the pipe string 4 when the pipeline is being laid on the seabed 4, whilst the other clamping member 10 is moved along the pipe string 4 with respect to said one engaging clamping member 10. In this manner it is ensured that the weight of the part of the pipe string that extends between the surface 11 and the seabed 5 is transmitted to the pipe laying vessel 1 via at least one clamping member 10, the winch 9 and the crane 8.

It is noted that instead of clamping members 10 engaging the periphery of the pipe string 4, also engaging means in the form of rollers engaging the periphery of the pipe string 4 may be provided, which rollers exert a force transversely to the longitudinal direction of the pipe string 4. Such a pressure-exerting clamping system is also used aboard the pipe laying vessel 1 for clamping the pipe string 4 to the pipe laying vessel 1. In FIG. 2 such a system is indicated by numeral 6. Furthermore, engaging means in the form of members engaging around the pipe string 4 under thickenings thereof are provided, which members are connected to the winches 9 of the crane 8. The pipe string 4 is thus held suspended from the vessel by the engaging means.

According to the invention, the substantially vertical pulling force of the pipe string 4, or the weight of the part of the pipe string 4 that extends between the pipe laying vessel 1 and the seabed 5, is transmitted to the pipe laying vessel 1 via the supporting means 8–10. Axial stresses are removed from the pipe string 4 at a location where the pipe string is to be bent over the stinger 3 most strongly. The forces that are exerted on the stringer 3 can remain relatively small thereby, as a result of which frictions and wear on the stinger 3 are also minimized. The supporting means 8–10 according to the present invention can be used for laying a pipeline in shallow water as well as in deep water and at transitions from shallow water to deep water.

What is claimed is:

1. A device for laying a pipeline on a seabed, comprising:
    a vessel for laying a pipeline, which is fitted with a stinger for guiding a pipe string descending from the vessel and with clamping means for clamping said pipe string to the vessel, and
    supporting means for supporting the part of the pipe string that extends between the surface and the seabed, characterized in that said supporting means comprise a cantilever structure which is fixedly connected to the vessel and engaging means that mate therewith, which means engage the pipe string and transmit axial stresses from the pipe string to the vessel via the cantilever structure, said engaging means in continual contact with the pipe string whereby axial stresses from the pipe string are continuously transmitted to said vessel.

2. A device according claim 1, wherein said engaging means engage the part of the pipe string that extends between the stinger and the seabed.

3. A device according claim 1, wherein said cantilever structure comprises a crane which is disposed on the stern of the vessel.

4. A device according claim 1, wherein said engaging means allow a relative movement in the longitudinal direction of the pipe between the pipe string and the engaging means.

5. A device according claim 1, wherein said engaging means clampingly engage the pipe string.

6. A device according claim 5, wherein said engaging means are elements fitted round the periphery of the pipe string.

7. A device according claim 5, wherein said engaging means are rollers engaging the periphery of the pipe string, which rollers exert a force transversely to the longitudinal direction of the pipe string.

8. A device according claim 1, wherein said engaging means engage the pipe string in suspension under thickenings thereof.

9. A method for laying a pipeline on a seabed wherein a pipe string is bent over a stinger from a pipeline-laying vessel and lowered to the seabed, wherein the pipe string is clamped to the vessel for welding respective lengths of pipeline to the end of the pipe string, and wherein the part of the pipe string that extends between the surface and the seabed is continually supported by supporting means that are fixedly connected to the vessel so as to continuously transmit axial stresses from the pipe string to the vessel via said supporting means.

10. A method according to claim 9, wherein, each time a length of pipeline has been welded to the end of the pipe string, the vessel is moved so as to lower the pipe string from the vessel to the seabed, the part of the pipe string that extends between the surface and the seabed is moved with respect to the supporting means whilst the pipe string is clamped to or held suspended from the vessel.

\* \* \* \* \*